(12) United States Patent
Tomovic et al.

(10) Patent No.: US 11,414,543 B2
(45) Date of Patent: *Aug. 16, 2022

(54) HARD TRANSPARENT THERMOPLASTIC POLYURETHANE

(71) Applicant: BASF SE, Ludwigshafen am Rhein (DE)

(72) Inventors: Zeljko Tomovic, Lemfoerde (DE); Sebastian Richter, Lemfoerde (DE); Frank Schaefer, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/349,798

(22) PCT Filed: Dec. 22, 2017

(86) PCT No.: PCT/EP2017/084428
§ 371 (c)(1),
(2) Date: May 14, 2019

(87) PCT Pub. No.: WO2018/115464
PCT Pub. Date: Jun. 28, 2018

(65) Prior Publication Data
US 2019/0359823 A1    Nov. 28, 2019

(30) Foreign Application Priority Data

Dec. 23, 2016  (EP) .................... 16206699

(51) Int. Cl.
| | |
|---|---|
| *C08L 75/06* | (2006.01) |
| *C08G 18/32* | (2006.01) |
| *C08G 18/42* | (2006.01) |
| *C08G 18/66* | (2006.01) |
| *C08G 18/73* | (2006.01) |
| *C08G 18/76* | (2006.01) |
| *C08G 18/75* | (2006.01) |

(52) U.S. Cl.
CPC .......... *C08L 75/06* (2013.01); *C08G 18/3206* (2013.01); *C08G 18/4216* (2013.01); *C08G 18/664* (2013.01); *C08G 18/73* (2013.01); *C08G 18/758* (2013.01); *C08G 18/7671* (2013.01); *C08G 2140/00* (2013.01); *C08G 2410/00* (2013.01); *C08L 2201/10* (2013.01); *C08L 2203/20* (2013.01)

(58) Field of Classification Search
CPC .. C08L 75/06; C08L 2201/10; C08L 2203/20; C08G 18/3206; C08G 18/4216; C08G 18/664; C08G 18/73; C08G 18/7671; C08G 18/758; C08G 2140/00; C08G 2410/00

See application file for complete search history.

(56) References Cited

U.S. PATENT DOCUMENTS

| | | | |
|---|---|---|---|
| 4,062,825 A | 12/1977 | Watabe et al. | |
| 4,186,257 A | 1/1980 | Blahak et al. | |
| 4,202,950 A | 5/1980 | Statton | |
| 4,228,249 A | 10/1980 | Blahak et al. | |
| 4,555,536 A * | 11/1985 | Maki ................ | C08G 18/5021 524/66 |
| 5,352,508 A * | 10/1994 | Cheong ................ | A61L 15/24 424/443 |
| 5,496,496 A | 3/1996 | Kajita et al. | |
| 5,574,092 A | 11/1996 | Oriani et al. | |
| 5,627,254 A | 5/1997 | Oriani | |
| 8,507,633 B2 * | 8/2013 | Henze ................ | C08G 18/6674 528/85 |
| 2015/0291757 A1 | 10/2015 | Woutters et al. | |
| 2019/0322794 A1 * | 10/2019 | Richter ................ | C08G 18/73 |

FOREIGN PATENT DOCUMENTS

| | | |
|---|---|---|
| EP | 1 529 814 A2 | 5/2005 |
| EP | 1 556 433 | 7/2005 |
| EP | 2 687 552 A1 | 1/2014 |
| GB | 1447644 * | 8/1976 |
| WO | 2004/037891 A1 | 5/2004 |
| WO | WO 2007/118827 A1 | 10/2007 |
| WO | WO 2015/063062 A1 | 5/2015 |

OTHER PUBLICATIONS

Odian, George, Principles of Polymerization, Third Edition, John Wiley & Sons, Inc., 1991, pp. 19-24.*

(Continued)

*Primary Examiner* — Patrick D Niland
(74) *Attorney, Agent, or Firm* — Grüneberg and Myers PLLC

(57) ABSTRACT

The present invention relates to a thermoplastic polyurethane obtainable or obtained by converting a polyisocyanate composition, a one chain extender, and a polyol composition, wherein the polyol composition comprises a polyol (P1) which has a molecular weight Mw in the range from 500 to 2000 g/mol and has at least one aromatic polyester block (B1), wherein the hard segment content in the thermoplastic polyurethane is <75%. The present invention further relates to a process for producing a shaped body comprising such a thermoplastic polyurethane, and to shaped bodies obtainable or obtained by a process of the invention.

21 Claims, No Drawings

(56) References Cited

OTHER PUBLICATIONS

International Search Report dated Mar. 9, 2018 in PCT/EP2017/084428, 2 pages.
"Polyurethane" Kunststoffhandbuch, Carl Hanser Verlag, 3rd edition, vol. 7, chapter 3.1, 1993, pp. 57-75.
"Polyurethane" Kunststoffhandbuch, Carl Hanser Verlag, 1st edition, vol. 7, 1966, pp. 103-113.
International Preliminary Report on Patentability dated Jun. 27, 2019 in PCT/EP2017/084423 (submitting English translation only).
Non-Final Office Action dated Dec. 16, 2020 in U.S. Appl. No. 16/462,977, 17 pages.
Carl Hanser Verlag, Kunststoff-Handbuch, Band 7, "Polyurethane", 1. Auflage1966, S. 103-113, pp. 96-120 with cover pages.
U.S. Office Action dated Jun. 24, 20222 in U.S. Appl. No. 16/623,651, 17 pages.

* cited by examiner

HARD TRANSPARENT THERMOPLASTIC POLYURETHANE

The present invention relates to a thermoplastic polyurethane obtainable or obtained by converting a polyisocyanate composition, a one chain extender, and a polyol composition, wherein the polyol composition comprises a polyol (P1) which has a molecular weight Mw in the range from 500 to 2000 g/mol and has at least one aromatic polyester block (B1), wherein the hard segment content in the thermoplastic polyurethane is <75%. The present invention further relates to a process for producing a shaped body comprising such a thermoplastic polyurethane, and to shaped bodies obtainable or obtained by a process of the invention.

Thermoplastic polyurethanes for various applications are known in principle from the prior art. By the variation in the feedstocks, it is possible to obtain different profiles of properties.

U.S. Pat. No. 5,574,092 discloses a rigid thermoplastic polyurethane having a Tg of at least 50° C., comprising a hard segment based on a diisocyanate and a chain extender mixture comprising an aromatic diol. According to the examples, very brittle materials having an elongation at break of less than 170% are obtained.

U.S. Pat. No. 5,627,254 also discloses rigid thermoplastic polyurethanes comprising units of butanediol (BDO) and a polyethylene glycol (PEG) of the HO—$(CH_2CH_2O)_n$—H type where n is an integer from 2 to 6. These materials have the disadvantage of being brittle and difficult to process.

WO 2015/063062 A1 relates to thermoplastic polyurethanes obtainable or obtained by reacting at least one aliphatic polyisocyanate, at least one chain extender and at least one polyol composition, wherein the polyol composition comprises a polyol selected from the group consisting of polyetherols and at least one bisphenol derivative selected from the group consisting of bisphenol A derivatives having a molecular weight Mw>315 g/mol and bisphenol S derivatives having a molecular weight Mw>315 g/mol, wherein at least one of the OH groups of the bisphenol derivative has been alkoxylated, and to processes for producing such thermoplastic polyurethanes and to the use of a thermoplastic polyurethane of the invention for production of extrusion products, films and shaped bodies. Such aliphatic TPUs having a hardness of >70 Shore D have a low modulus of elasticity and only inadequate elongation at break. A further disadvantage is the use of bisphenol A, which is of some toxicological concern.

Typically, hard thermoplastic polyurethanes have a hard segment content of not less than 75%, and these are obtained by reaction of isocyanates and chain extenders, for example hexane-1,6-diol or cyclohexane-1,4-dimethanol. These materials have high hardness and high dimensional stability, but are very brittle and only have an elongation at break of less than 200% or even less than 100%.

Many applications, however, need materials that have not only a high hardness, i.e., more particularly, a hardness of >75 Shore D and a modulus of elasticity of >2000 MPa at room temperature, but also a good elongation at break of more than 300%.

Proceeding from the prior art, it was an object of the present invention to provide a thermoplastic polyurethane which is firstly transparent and has high hardness and a high modulus of elasticity and secondly has very good elongation at break. It was a further object of the present invention to provide a thermoplastic polyurethane which is firstly transparent and has high hardness and a high modulus of elasticity and secondly has very good elongation at break, which is producible in a simple and inexpensive manner in a one-shot process.

According to the invention, this object is achieved by a thermoplastic polyurethane obtainable or obtained by converting at least components (i) to (iii):
 (i) a polyisocyanate composition,
 (ii) at least one chain extender, and
 (iii) at least one polyol composition,
wherein the polyol composition comprises at least one polyol (P1) which has a molecular weight Mw in the range from 500 to 2000 g/mol and has at least one aromatic polyester block (B1),
wherein the hard segment content in the thermoplastic polyurethane is <75%.

According to the invention, the polyol (P1) has a molecular weight Mw in the range from 500 to 2000 g/mol. In addition, the polyol (P1) has an aromatic polyester block (B1). In the context of the present invention, this is understood to mean that the aromatic polyester block (B1) may be a polyester of an aromatic dicarboxylic acid and an aliphatic diol or a polymer of an aliphatic dicarboxylic acid and an aromatic diol. Preferably, the aromatic polyester block (B1) in the context of the present invention is a polyester of an aromatic dicarboxylic acid and an aliphatic diol. Suitable aromatic dicarboxylic acids are, for example, terephthalic acid, isophthalic acid or phthalic acid, preferably terephthalic acid. Accordingly, suitable polyols (P1) in the context of the present invention are those that have, for example, at least one polyethylene terephthalate block or at least one polybutylene terephthalate block, where the number of repeat units in the aromatic systems is at least 2 in series. Preferably, the aromatic polyester block (B1) is prepared in a separate step prior to the further conversion to polyol in order to assure a sufficient block length of the repeat units of the aromatic systems.

According to the invention, the thermoplastic polyurethane may especially be a compact thermoplastic polyurethane. Accordingly, the present invention, in a further embodiment, relates to a thermoplastic polyurethane as described above, wherein the thermoplastic polyurethane is a compact thermoplastic polyurethane.

In a further embodiment, the present invention accordingly relates to a thermoplastic polyurethane as described above, wherein the aromatic polyester block (B1) is a polyester of an aromatic dicarboxylic acid and an aliphatic diol. In a further embodiment, the present invention also relates to a thermoplastic polyurethane as described above, wherein the aromatic polyester block (B1) is a polyethylene terephthalate block or a polybutylene terephthalate block. In a further preferred embodiment, the present invention further relates to a thermoplastic polyurethane as described above, wherein the aromatic polyester block (B1) is a polyethylene terephthalate block.

According to the invention, the thermoplastic polyurethane has a hard segment content of <75%. The hard segment content here is the proportion of the thermoplastic polyurethane which is formed by isocyanate and chain extender. In the context of the present invention, the hard segment content is determined by the formula disclosed in WO 2007/118827 A1, where a value of 1.0 corresponds to 100%, meaning that a hard segment content of <75% corresponds to a value of <0.75 by the formula specified in WO 2007/118827 A1.

It has been found that, surprisingly, the use of polyols (P1) having a molecular weight Mw in the range from 500 to 2000 g/mol and having at least one aromatic polyester block (B1) affords thermoplastic polyurethanes having a hard segment content of <75% that are transparent, have high hardness and are simultaneously not brittle. Thus, the thermoplastic polyurethanes of the invention have a hardness of >75 Shore D, a modulus of elasticity of >2000 MPa at room temperature and an elongation at break of >300%.

In the context of the present invention, suitable polyols (P1) are especially those that are based on aromatic polyesters, such as polybutylene terephthalate (PBT) or polyethylene terephthalate (PET). Preferably, the polyol (P1) is prepared here by reacting the aromatic polyester with dicarboxylic acids and diols to give mixed aromatic/aliphatic polyester diols. For example, it is possible in the context of the present invention to react the aromatic polyester in solid or liquid form with dicarboxylic acids and diols. According to the invention, the aromatic polyester used typically has a higher molecular weight than the blocks (B1) present in the polyol (P1).

Polyester polyols (P1) suitable in accordance with the invention typically comprise 20% to 70% by weight, preferably 30% to 60% by weight, more preferably 35% to 55% by weight, further preferably 40% to 50% by weight, of the aromatic polyester blocks (B1), based in each case on the overall polyester polyol (P1). In a further embodiment, the present invention accordingly relates to a thermoplastic polyurethane as described above, wherein the polyol (P1) includes 20% to 70% by weight of the aromatic polyester blocks (B1), based on the overall polyester polyol (P1).

According to the invention, the polyol (P1) has a molecular weight Mw in the range from 500 to 2000, preferably in the range from 750 to 1500, more preferably in the range from 900 to 1200 and most preferably in the range from 950 to 1050 g/mol. In a further embodiment, the present invention accordingly relates to a thermoplastic polyurethane as described above, wherein the polyol (P1) has a molecular weight Mw in the range from 750 to 5000 g/mol.

The molecular weight (Mw) is calculated using the following formula, where z is the functionality of the polyester polyol and z=2:

$$Mw = 1000 \text{ mg/g} \cdot [(z \cdot 56.106 \text{ g/mol})/(OHN \text{ [mg/g]})]$$

In the preparation of the polyols (P1), preferably aromatic polyesters such as polybutylene terephthalate (PBT) or polyethylene terephthalate (PET) are used. Polyethylene terephthalate is a thermoplastic polymer prepared by polycondensation. The quality of the PET, and its physical properties such as toughness or durability, are dependent on the chain length. Older PET synthesis methods are based on the transesterification of dimethyl terephthalate with ethylene glycol. Nowadays, PET is synthesized almost exclusively by direct esterification of terephthalic acid with ethylene glycol. In the same way, terephthalic acid can also be reacted with butane-1,4-diol to give polybutylene terephthalate (PBT). This likewise thermoplastic polymer is available under brands such as CRASTIN® (DuPont), POCAN® (Lanxess), ULTRADUR® (BASF) or ENDURAN® and VESTODUR® (SABIC IP). Its chemical and physical/technical properties correspond largely to those of PET.

According to the invention, it is also possible to use aromatic polyesters such as polybutylene terephthalate (PBT) or polyethylene terephthalate (PET) that are obtained from recycling processes. For example, polyethylene terephthalate can be used in the form of flakes that are obtained from plastic recycling processes. Materials of this kind typically have molecular weights of about 12 000 g/mol.

According to the invention, suitable polyols (P1) can also be obtained using aromatic polyesters such as polybutylene terephthalate or polyethylene terephthalate with higher molecular weight and diols by transesterification. Suitable reaction conditions are known per se to those skilled in the art.

In addition, in the preparation of the polyols (P1), diols having 2 to 10 carbon atoms, for example ethanediol, propanediol, butanediol, pentanediol, hexanediol or di- or triethylene glycol, especially butane-1,4-diol or mixtures thereof, are used. It is also possible to use short polyether diols, for example PTHF 250 or PTHF 650 or a short-chain polypropylene glycol such as a PPG 500. Dicarboxylic acids used may, for example, be linear or branched-chain diacids having four to 12 carbon atoms or mixtures thereof. Preference is given to using adipic acid, succinic acid, glutaric acid or sebacic acid or a mixture of the acids mentioned. Particular preference is given in the context of the present invention to adipic acid. According to the invention, in the preparation of the polyols (P1), it is also possible to use further polyester diols as feedstocks, for example butanediol adipate or ethylene adipate.

It is essential in the context of the present invention that, in the preparation of the thermoplastic polyurethane, at least one chain extender and the polyol composition as described above are used.

According to the invention, it is possible to use one chain extender, but it is also possible to use mixtures of different chain extenders.

Chain extenders used in the context of the present invention may, for example, be compounds having hydroxyl or amino groups, especially having 2 hydroxyl or amino groups. According to the invention, however, it is also possible that mixtures of different compounds are used as chain extenders. According to the invention, the average functionality of the mixture is 2.

Preference is given in accordance with the invention to using compounds having hydroxyl groups as chain extenders, especially diols. It is preferably possible to use aliphatic, araliphatic, aromatic and/or cycloaliphatic diols having a molecular weight of 50 g/mol to 220 g/mol.

Preference is given to alkanediols having 2 to 10 carbon atoms in the alkylene radical, especially di-, tri-, tetra-, penta-, hexa-, hepta-, octa-, nona- and/or decaalkylene glycols. For the present invention, particular preference is given to 1,2-ethylene glycol, propane-1,3-diol, butane-1,4-diol, hexane-1,6-diol. It is also possible to use aromatic compounds such as hydroxyquinone bis(2-hydroxyethyl) ether.

According to the invention, it is also possible to use compounds having amino groups, for example diamines. It is likewise possible to use mixtures of diols and diamines.

The chain extender is preferably a diol having a molecular weight Mw<220 g/mol. According to the invention, it is possible that only one diol having a molecular weight Mw<220 g/mol is used for preparation of the transparent thermoplastic polyurethane.

In a further embodiment, more than one diol is used as chain extender. It is thus also possible to use mixtures of chain extenders, where at least one diol has a molecular weight Mw<220 g/mol. If more than one chain extender is used, the second or further chain extender may also have a molecular weight of≥220 g/mol.

In a further embodiment, the chain extender is selected from the group consisting of butane-1,4-diol and hexane-1,6-diol.

In a further embodiment, the present invention accordingly relates to a thermoplastic polyurethane as described above, wherein the chain extender used in (ii) is a diol having a molecular weight Mw<220 g/mol.

The chain extender, especially the diol having a molecular weight Mw<220 g/mol, is preferably used in a molar ratio in the range from 40:1 to 1:10 relative to the polyol (P1). Preferably, the chain extender and the polyol (P1) are used in a molar ratio in the range from 20:1 to 1:9, further preferably in the range from 10:1 to 1:8, for example in the range from 5:1 to 1:5, or else in the range from 4:1 to 1:4, further preferably in the range from 3:1 to 1:2.

In a further embodiment, the present invention accordingly relates to a thermoplastic polyurethane as described above, wherein the chain extender used in (ii) and the polyol (P1) present in the polyol composition are used in a molar ratio of 40:1 to 1:10.

According to the invention, the polyol composition may comprise further polyols as well as the at least one polyol (P1). Accordingly, in the context of the present invention, it is also possible to use at least one chain extender and a polyol composition comprising at least one polyol (P1) as described above and at least one further polyol.

In another embodiment, the present invention accordingly provides a thermoplastic polyurethane as described above, wherein the polyol composition comprises a further polyol selected from the group consisting of polyetherols, polyesterols, polycaprolactone alcohols and hybrid polyols.

Higher molecular weight compounds having hydrogen atoms reactive toward isocyanates that are used may be the commonly known polyols having compounds reactive toward isocyanates.

Polyols are known in principle to those skilled in the art and described for example in "Kunststoffhandbuch [Plastics Handbook], volume 7, Polyurethane", Carl Hanser Verlag, 3rd edition 1993, chapter 3.1. Particular preference is given to using polyesterols or polyetherols as polyols. Particular preference is given to polyester polyols. It is likewise possible to use polycarbonates. Copolymers may also be used in the context of the present invention. The number-average molecular weight of polyols used in accordance with the invention is preferably between $0.5 \times 10^3$ g/mol and $8 \times 10^3$ g/mol, preferably between $0.6 \times 10^3$ g/mol and $5 \times 10^3$ g/mol, especially between $0.8 \times 10^3$ g/mol and $3 \times 10^3$ g/mol.

They preferably have an average functionality with respect to isocyanates of 1.8 to 2.3, more preferably 1.9 to 2.2, especially 2.

Polyesterols used may be polyesterols based on diacids and diols. Diols used are preferably diols having 2 to 10 carbon atoms, for example ethanediol, propanediol, butanediol, pentanediol, hexanediol or di- or triethylene glycol, especially butane-1,4-diol or mixtures thereof. Diacids used may be any known diacids, for example linear or branched-chain diacids having four to 12 carbon atoms or mixtures thereof. Preference is given to using adipic acid as diacid.

Preferred polyetherols are in accordance with the invention polyethylene glycols, polypropylene glycols and polytetrahydrofurans.

In a particularly preferred embodiment, the polyol is a polytetrahydrofuran (PTHF) having a molecular weight in the Mw range of 600 g/mol to 2500 g/mol.

According to the invention, as well as PTHF, various other polyethers are suitable, but polyesters, block copolymers and hybrid polyols, for example poly(ester/amide), are also usable.

Preferably, the polyols used have an average functionality between 1.8 and 2.3, preferably between 1.9 and 2.2, especially 2. Preferably, the polyols used in accordance with the invention have solely primary hydroxyl groups.

According to the invention, the polyol may be used in pure form or in the form of a composition comprising the polyol and at least one solvent. Suitable solvents are known per se to a person skilled in the art.

The additional polyol is preferably used in a molar ratio in the range from 10:1 to 1:10 relative to the polyol (P1). In further-preferred embodiments, the further polyol and the polyol (P1) are used in a molar ratio in the range from 9:1 to 1:9, further preferably in the range from 5:1 to 1:5.

According to the invention, at least one polyisocyanate is used. According to the invention, it is also possible to use mixtures of two or more polyisocyanates.

Preferred polyisocyanates in the context of the present invention are diisocyanates, especially aliphatic or aromatic diisocyanates, further preferably aromatic diisocyanates.

In a further embodiment, the present invention accordingly relates to a thermoplastic polyurethane as described above, wherein the polyisocyanate is an aliphatic or aromatic diisocyanate.

According to the invention, the components are converted in such a ratio that the hard segment content in the thermoplastic polyurethane is <75%, preferably <70%, further preferably <50%, more preferably <40%. The hard segment content in the thermoplastic polyurethane is thus preferably in the range from 10% to 75%, preferably in the range from 20% to 70%, further preferably in the range from 20% to 50%, more preferably in the range from 20% to 40%.

In addition, in the context of the present invention, isocyanate components used may be prereacted prepolymers in which some of the OH components have been reacted with an isocyanate in a preceding reaction step. These prepolymers are reacted with the remaining OH components in a further step, the actual polymer reaction, and then form the thermoplastic polyurethane. The use of prepolymers makes it possible also to use OH components having secondary alcohol groups.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylene dicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and methylene dicyclohexyl 4,4'-, 2,4'- and/or 2,2'-diisocyanate (H12MDI); especially preferred are methylene dicyclohexyl 4,4'-, 2,4'- and/or 2,2'-diisocyanate (H12MDI) and 1-isocyanato-3,3,5-trimethyl-5-isocyanatomethylcyclohexane or mixtures thereof.

In a further embodiment, the present invention accordingly relates to a process as described above, wherein the polyisocyanate is selected from the group consisting of methylene dicyclohexyl 4,4'-, 2,4'- and/or 2,2'-diisocyanate (H12MDI), hexamethylene diisocyanate (HDI) and 1-isocyanato-3,3,5-trimethyl-5-isocyanatomethylcyclohexane (IPDI) or mixtures thereof.

Suitable aromatic diisocyanates are especially diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODI, p-phenylene diisocyanate (PDI), diphenylethane 4,4'-diisocyanate (EDI), diphenylmethane diisocyanate, dimethyl diphenyl 3,3'-diisocyanate, diphenylethane 1,2-diisocyanate and/or phenylene diisocyanate.

Preferred aromatic diisocyanates are diphenylmethane 2,2'-, 2,4'- and/or 4,4'-diisocyanate (MDI) and mixtures thereof.

Preferred examples of higher-functionality isocyanates are tri isocyanates, e.g. triphenylmethane 4,4',4"-triisocyanate, and also the cyanurates of the aforementioned diisocyanates, and the oligomers obtainable by partial reaction of diisocyanates with water, for example the biurets of the aforementioned diisocyanates, and also oligomers obtainable by controlled reaction of semiblocked diisocyanates with polyols having an average of more than 2 and preferably 3 or more hydroxyl groups.

In a further embodiment, the present invention relates to a process as described above, wherein the polyisocyanate is an aliphatic diisocyanate.

According to the invention, the polyisocyanate may be used in pure form or in the form of a composition comprising the polyisocyanate and at least one solvent. Suitable solvents are known to those skilled in the art. Suitable examples are nonreactive solvents such as ethyl acetate, methyl ethyl ketone, tetrahydrofuran and hydrocarbons.

According to the invention, in the reaction of the at least one aliphatic polyisocyanate, the at least one chain extender, and the at least one polymer composition, it is possible to add further feedstocks, for example catalysts or auxiliaries and additives.

Suitable auxiliaries and additives are known per se to those skilled in the art. Examples include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable auxiliaries and additives may be found, for example, in Kunststoffhandbuch [Plastics Handbook], volume VII, published by Vieweg and Höchtlen, Carl Hanser Verlag, Munich 1966 (p. 103-113).

Suitable catalysts are likewise known in principle from the prior art. Suitable catalysts are for example organic metal compounds selected from the group consisting of tin, titanium, zirconium, hafnium, bismuth, zinc, aluminum and iron organyls, for example tin organyl compounds, preferably tin dialkyls such as tin(II) isooctoate, tin dioctoate, dimethyltin or diethyltin, or tin organyl compounds of aliphatic carboxylic acids, preferably tin diacetate, tin dilaurate, dibutyltin diacetate, dibutyltin dilaurate, titanate esters, bismuth compounds, such as bismuth alkyl compounds, preferably bismuth neodecanoate or similar, or iron compounds, preferably iron(III) acetylacetonate.

In a preferred embodiment, the catalysts are selected from tin compounds and bismuth compounds, more preferably tin alkyl compounds or bismuth alkyl compounds. Tin(II) isooctoate and bismuth neodecanoate are particularly suitable.

The catalysts are typically used in amounts of 3 ppm to 2000 ppm, preferably 10 ppm to 1000 ppm, further preferably 20 ppm to 500 ppm and most preferably 30 ppm to 300 ppm.

In a further aspect, the present invention also relates to a process for producing a shaped body (SC) comprising the following steps:

(a) preparing a thermoplastic polyurethane comprising the composition of
  (i) at least one polyisocyanate composition;
  (ii) at least one chain extender; and
  (iii) at least one polyol composition,
  wherein the polyol composition comprises at least one polyol (P1) which has a molecular weight Mw in the range from 500 to 2000 g/mol and has at least one aromatic polyester block (B1),
  wherein the hard segment content in the thermoplastic polyurethane is <75%;
(b) producing a shaped body (SC) from the thermoplastic polyurethane.

The process according to the invention comprises the steps (a) and (b). First of all, in step (a), a thermoplastic polyurethane is prepared by reacting at least one polyisocyanate composition, at least one chain extender and at least one polyol composition. According to the invention, the polyol composition here comprises at least one polyol (P1) which has a molecular weight Mw in the range from 500 to 2000 g/mol and has at least one aromatic polyester block (B1).

In step (b), a shaped body (SC) is produced from the thermoplastic polyurethane obtained in step (a). In the context of the present invention, the shaped body (SC) may also, for example, be a foil. In the context of the present invention, the shaped body (SC) can be produced by all customary methods, for example by extrusion, injection molding or sintering methods or from solution. Especially the production of the shaped body (SC) by injection molding is preferred in the context of the present invention.

In a further embodiment, the present invention accordingly relates to a process as described above, wherein the shaped body (SC) is produced in step (b) by means of extrusion, injection molding or sintering methods or from solution.

The process in step (a) can in principle be conducted under the reaction conditions that are known per se.

In a preferred embodiment, the process in step (a) is conducted at higher temperatures than room temperature, further preferably in the range between 50° C. and 200° C., more preferably in the range from 55° C. to 150° C., especially in the range from 60° C. to 120° C.

According to the invention, heating can be effected in any suitable manner known to the person skilled in the art, preferably by electrical heating, heating via heated oil, heated polymer fluids or water, induction fields, hot air or IR radiation.

The resultant thermoplastic polyurethanes are processed in accordance with the invention to give a shaped body (SC). The process accordingly comprises step (a) and step (b). According to the invention, the process may comprise further steps, for example thermal treatments.

By the process of the invention, shaped bodies (SC) that are transparent, have high hardness and are simultaneously not brittle are obtained. In a further aspect, the present invention also relates to shaped bodies obtainable or obtained by a process as described above.

In principle, the shaped bodies (SC) may be bodies of all possible shapes, for example extrusion products such as films and other shaped bodies. According to the invention, the shaped body may especially comprise consumer articles, for example for uses such as toothbrushes, razors, housings for domestic articles, displays, computer or phone parts, plugs, automobile interior trim parts, footwear parts, for example caps for safety footwear.

In a further embodiment, the present invention accordingly relates to a shaped body as described above, wherein the shaped body is a consumer article, for example for uses such as toothbrushes, razors, housings for domestic articles, displays, computer or phone parts, plugs, an automobile interior trim part, a footwear part, for example a cap for safety footwear.

Further embodiments of the present invention are apparent from the claims and the examples. It will be appreciated that the features of the subject matter/processes/uses according to the invention that are recited hereinabove and elucidated hereinbelow are usable not only in the combination specified in each case but also in other combinations without departing from the scope of the invention. For example, the combination of a preferred feature with a particularly preferred feature or of a feature not characterized further with a particularly preferred feature etc. is thus also encompassed implicitly even if this combination is not mentioned explicitly.

Illustrative embodiments of the present invention are listed below, but do not restrict the present invention. In particular, the present invention also encompasses those embodiments that result from the dependency references and hence combinations specified hereinafter. More particularly, in the case of naming of a range of embodiments hereinafter, for example the expression "The process according to any of embodiments 1 to 4", should be understood such that any combination of the embodiments within this range is explicitly disclosed to the person skilled in the art, meaning that the expression should be regarded as being synonymous to "The process according to any of embodiments 1, 2, 3 and 4".

1. A thermoplastic polyurethane obtainable or obtained by converting at least components (i) to (iii):
   (i) a polyisocyanate composition,
   (ii) at least one chain extender, and
   (iii) at least one polyol composition,
   wherein the polyol composition comprises at least one polyol (P1) which has a molecular weight Mw in the range from 500 to 2000 g/mol and has at least one aromatic polyester block (B1),
   wherein the hard segment content in the thermoplastic polyurethane is <75%.
2. The thermoplastic polyurethane according to embodiment 1, wherein the polyol (P1) includes 20% to 70% by weight of the aromatic polyester blocks (B1), based on the overall polyester polyol (P1).
3. The thermoplastic polyurethane according to embodiment 1 or 2, wherein the aromatic polyester block (B1) is a polyester of an aromatic dicarboxylic acid and an aliphatic diol.
4. The thermoplastic polyurethane according to any of embodiments 1 to 3, wherein the aromatic polyester block (B1) is a polyethylene terephthalate block or a polybutylene terephthalate block.
5. The thermoplastic polyurethane according to any of embodiments 1 to 4, wherein the aromatic polyester block (B1) is a polyethylene terephthalate block.
6. The thermoplastic polyurethane according to any of embodiments 1 to 5, wherein the polyol (P1) has a molecular weight Mw in the range from 750 to 1500 g/mol.
7. The thermoplastic polyurethane according to any of embodiments 1 to 6, wherein the polyol (P1) is obtained from an aromatic polyester having a molecular weight in the range from 10 000 to 14 000 g/mol.
8. The thermoplastic polyurethane according to any of embodiments 1 to 7, wherein the polyol (P1) is obtained by transesterification from an aromatic polyester having a molecular weight in the range from 10 000 to 14 000 g/mol.
9. The thermoplastic polyurethane according to any of embodiments 1 to 8, wherein the polyol (P1) is obtained by transesterification from a polyethylene terephthalate having a molecular weight in the range from 10 000 to 14 000 g/mol.
10. The thermoplastic polyurethane according to any of embodiments 1 to 9, wherein the chain extender used in (ii) is a diol having a molecular weight Mw<220 g/mol.
11. The thermoplastic polyurethane according to any of embodiments 1 to 10, wherein the chain extender used in (ii) and the polyol (P1) present in the polyol composition are used in a molar ratio of 40:1 to 1:10.
12. The thermoplastic polyurethane according to any of embodiments 1 to 11, wherein the polyol composition comprises a further polyol selected from the group consisting of polyetherols, polyesterols, polycarbonate alcohols and hybrid polyols.
13. The thermoplastic polyurethane according to any of embodiments 1 to 12, wherein the polyisocyanate is an aliphatic or aromatic diisocyanate.
14. The thermoplastic polyurethane according to any of embodiments 1 to 13, wherein the hard segment content in the thermoplastic polyurethane is in the range from 10% to 75%.
15. A process for producing a shaped body (SC) comprising the following steps:
   (a) preparing a thermoplastic polyurethane comprising the composition of
      (i) at least one polyisocyanate composition;
      (ii) at least one chain extender; and
      (iii) at least one polyol composition,
      wherein the polyol composition comprises at least one polyol (P1) which has a molecular weight Mw in the range from 500 to 2000 g/mol and has at least one aromatic polyester block (B1),
      wherein the hard segment content in the thermoplastic polyurethane is <75%;
   (b) producing a shaped body (SC) from the thermoplastic polyurethane.
16. The process according to embodiment 15, wherein the shaped body (SC) is produced in step (b) by means of extrusion, injection molding or sintering methods or from solution.
17. A shaped body obtainable or obtained by a process according to either of embodiments 15 and 16.
18. The shaped body according to embodiment 17, wherein the shaped body is a consumer article, for example for uses such as toothbrushes, razors, housings for domestic articles, displays, computer or phone parts, plugs, an automobile interior trim part, a footwear part, for example a cap for safety footwear.
19. A thermoplastic polyurethane obtainable or obtained by converting at least components (i) to (iii):
   (i) a polyisocyanate composition,
   (ii) at least one chain extender, and
   (iii) at least one polyol composition,
   wherein the polyol composition comprises at least one polyol (P1) which has a molecular weight Mw in the range from 500 to 2000 g/mol and has at least one aromatic polyester block (B1),
   wherein the hard segment content in the thermoplastic polyurethane is <75%,
   wherein the polyol (P1) includes 20% to 70% by weight of the aromatic polyester blocks (B1), based on the overall polyester polyol (P1), and wherein the aromatic polyester block (B1) is a polyethylene terephthalate block or a polybutylene terephthalate block.

20. A thermoplastic polyurethane obtainable or obtained by converting at least components (i) to (iii):
    (i) a polyisocyanate composition,
    (ii) at least one chain extender, and
    (iii) at least one polyol composition,
    wherein the polyol composition comprises at least one polyol (P1) which has a molecular weight Mw in the range from 500 to 2000 g/mol and has at least one aromatic polyester block (B1),
    wherein the hard segment content in the thermoplastic polyurethane is in the range from 10% to 75%,
    wherein the polyol (P1) includes 20% to 70% by weight of the aromatic polyester blocks (B1), based on the overall polyester polyol (P1), and wherein the aromatic polyester block (B1) is a polyethylene terephthalate block.

21. The thermoplastic polyurethane according to either of embodiments 19 and 20, wherein the polyol (P1) has a molecular weight Mw in the range from 750 to 1500 g/mol.

22. The thermoplastic polyurethane according to any of embodiments 19 to 21, wherein the polyol (P1) is obtained from an aromatic polyester having a molecular weight in the range from 10 000 to 14 000 g/mol.

23. The thermoplastic polyurethane according to any of embodiments 19 to 22, wherein the polyol (P1) is obtained by transesterification from an aromatic polyester having a molecular weight in the range from 10 000 to 14 000 g/mol.

24. The thermoplastic polyurethane according to any of embodiments 19 to 23, wherein the polyol (P1) is obtained by transesterification from a polyethylene terephthalate having a molecular weight in the range from 10 000 to 14 000 g/mol.

25. The thermoplastic polyurethane according to any of embodiments 19 to 24, wherein the chain extender used in (ii) is a diol having a molecular weight Mw<220 g/mol.

26. The thermoplastic polyurethane according to any of embodiments 19 to 25, wherein the chain extender used in (ii) and the polyol (P1) present in the polyol composition are used in a molar ratio of 40:1 to 1:10.

27. The thermoplastic polyurethane according to any of embodiments 19 to 26, wherein the polyol composition comprises a further polyol selected from the group consisting of polyetherols, polyesterols, polycarbonate alcohols and hybrid polyols.

28. The thermoplastic polyurethane according to any of embodiments 19 to 27, wherein the polyisocyanate is an aliphatic or aromatic diisocyanate.

29. The thermoplastic polyurethane according to any of embodiments 19 to 28, wherein the polyisocyanate is an aromatic diisocyanate.

30. A process for producing a shaped body (SC) comprising the following steps:
    (a) preparing a thermoplastic polyurethane comprising the composition of
       (i) at least one polyisocyanate composition;
       (ii) at least one chain extender; and
       (iii) at least one polyol composition,
       wherein the polyol composition comprises at least one polyol (P1) which has a molecular weight Mw in the range from 500 to 2000 g/mol and has at least one aromatic polyester block (B1),
       wherein the hard segment content in the thermoplastic polyurethane is in the range from 10% to 75% and
       wherein the polyol (P1) includes 20% to 70% by weight of the aromatic polyester blocks (B1), based on the overall polyester polyol (P1), and wherein the aromatic polyester block (B1) is a polyethylene terephthalate block or a polyethylene terephthalate block;
    (b) producing a shaped body (SC) from the thermoplastic polyurethane.

31. The process according to embodiment 30, wherein the aromatic polyester block (B1) is a polyethylene terephthalate block.

32. The process according to either of embodiments 30 and 31, wherein the polyol (P1) has a molecular weight Mw in the range from 1700 to 2300 g/mol.

33. The process according to any of embodiments 30 to 32, wherein the chain extender used in (ii) is a diol having a molecular weight Mw<220 g/mol.

34. The process according to any of embodiments 30 to 33, wherein the chain extender used in (ii) and the polyol (P1) present in the polyol composition are used in a molar ratio of 40:1 to 1:10.

35. The process according to any of embodiments 30 to 34, wherein the shaped body (SC) is produced in step (b) by means of extrusion, injection molding or sintering methods or from solution.

36. A shaped body obtainable or obtained by a process according to any of embodiments 30 to 35.

37. The shaped body according to embodiment 36, wherein the shaped body is a consumer article, for example for uses such as toothbrushes, razors, housings for domestic articles, displays, computer or phone parts, plugs, an automobile interior trim part, a footwear part, for example a cap for safety footwear.

The examples below serve to illustrate the invention, but are in no way restrictive in respect of the subject matter of the present invention.

EXAMPLES

1 The Following Feedstocks were Used

Polyol 1: polyester polyol based on adipic acid, PET, butane-1,4-diol and diethylene glycol with an OH number of 111.2, functionality: 2
Polyol 2: polyester polyol based on adipic acid, PET, butane-1,4-diol and diethylene glycol with an OH number of 112.8, functionality: 2
Polyol 3: polyester polyol based on adipic acid, PET, butane-1,4-diol and propane-1,3-diol with an OH number of 112.1, functionality: 2
Polyol 4: polyester polyol based on adipic acid, succinic acid, glutaric acid, PET and diethylene glycol with an OH number of 75.6 and functionality: 2
Polyol 5: polyester polyol based on adipic acid, succinic acid, glutaric acid, PET and diethylene glycol with an OH number of 110.6 and functionality: 2
PET polyethylene terephthalate in the form of flakes with an average molecular weight Mw of 12 000 g/mol
Isocyanate 1: aromatic isocyanate (methylene diphenyl 4,4'-diisocyanate)
Isocyanate 2: aliphatic isocyanate (methylene dicyclohexyl 4,4'-diisocyanate)
CE 1: butane-1,4-diol
CE 2: hexane-1,6-diol Stabilizer 1: hydrolysis stabilizer based on polycarbodiimide Catalyst 1: 50% tin(II) isooctoate in diethylhexyl adipate

2 Synthesis of the Polyester Polyols with PET Blocks

2.1 Synthesis of Polyol 1

A 4000 ml round-neck flask provided with PT100 thermocouple, nitrogen inlet, stirrer, column, column head, Anschütz-Thiele attachment and heating mantle is initially charged with 880.84 g of adipic acid, 395.56 g of butane-1,4-diol and 465.79 g of diethylene glycol. The mixture is then heated to 120° C. until a homogeneous mixture is formed. 1000 g of polyethylene terephthalate (PET) are then added to the mixture in the form of PET flakes, and then 10 ppm=2.5 g of TTB (tetra-n-butyl orthotitanate, 1% in toluene). The reaction mixture is heated first to 180° C. for about 1.5 h and then further to 240° C., and the resultant water of reaction is continuously removed. Over the entire synthesis, the PET flakes are gradually degraded, and a transparent mixture is formed, which is condensed until a product having an acid number <1.0 mg KOH/g is obtained.

The polymer obtained has the following properties:
Hydroxyl number: 111.2 mg KOH/g
Acid number: 0.45 mg KOH/g
Viscosity at 75° C.: 757 mPas

2.2 Synthesis of Polyol 2

A 4000 ml round-neck flask provided with PT100 thermocouple, nitrogen inlet, stirrer, column, column head, Anschütz-Thiele attachment and heating mantle is initially charged with 705.39 g of adipic acid, 339.84 g of butane-1,4-diol and 400.18 g of diethylene glycol. The mixture is then heated to 120° C. until a homogeneous mixture is formed. 1250 g of polyethylene terephthalate (PET) are then added to the mixture in the form of PET flakes, and then 10 ppm=2.5 g of TTB (tetra-n-butyl orthotitanate, 1% in toluene). The reaction mixture is heated first to 180° C. for about 1.5 h and then further to 240° C., and the resultant water of reaction is continuously removed. Over the entire synthesis, the PET flakes are gradually degraded, and a transparent mixture is formed, which is condensed until a product having an acid number <1.0 mg KOH/g is obtained.

The polymer obtained has the following properties:
Hydroxyl number: 112.8 mg KOH/g
Acid number: 0.55 mg KOH/g
Viscosity at 75° C.: 1388 mPas

2.3 Synthesis of Polyol 3

A 4000 ml round-neck flask provided with PT100 thermocouple, nitrogen inlet, stirrer, column, column head, Anschütz-Thiele attachment and heating mantle is initially charged with 788.52 g of adipic acid, 309.27 g of propane-1,3-diol and 366.24 g of butane-1,4-diol. The mixture is then heated to 120° C. until a homogeneous mixture is formed. 1250 g of polyethylene terephthalate (PET) are then added to the mixture in the form of PET flakes, and then 10 ppm=2.5 g of TTB (tetra-n-butyl orthotitanate, 1% in toluene). The reaction mixture is heated first to 180° C. for about 1.5 h and then further to 240° C., and the resultant water of reaction is continuously removed. Over the entire synthesis, the PET flakes are gradually degraded, and a transparent mixture is formed, which is condensed until a product having an acid number <1.0 mg KOH/g is obtained.

The polymer obtained has the following properties:
Hydroxyl number: 112.1 mg KOH/g
Acid number: 0.38 mg KOH/g
Viscosity at 75° C.: 1803 mPas

2.4 Synthesis of Polyol 4

A 3000 ml round-neck flask provided with thermometer, nitrogen inlet, stirrer and heating mantle is initially charged with 819.5 g of dicarboxylic acid mixture (consisting of adipic acid, glutaric acid and succinic acid) and 925.9 g of diethylene glycol. The mixture is then heated to 120° C. until a homogeneous mixture is formed. 1000 g of polyethylene terephthalate (PET) in the form of PET flakes are then added to the mixture. The reaction mixture is heated further to 240° C. and the water of reaction formed is removed continuously. Over the entire synthesis, the PET flakes are gradually degraded, and a transparent mixture is formed, which is condensed until a product having an acid number <1.0 mg KOH/g is obtained.

The polymer obtained has the following properties:
Acid number: 110.6 mg KOH/g
Hydroxyl number: 0.6 mg KOH/g
Viscosity at 75° C.: 660 mPas

2.5 Synthesis of Polyol 5

A 3000 ml round-neck flask provided with thermometer, nitrogen inlet, stirrer and heating mantle is initially charged with 1040.9 g of dicarboxylic acid mixture (consisting of adipic acid, glutaric acid and succinic acid) and 1016.2 g of diethylene glycol. The mixture is then heated to 120° C. until a homogeneous mixture is formed. 750 g of polyethylene terephthalate (PET) in the form of PET flakes are then added to the mixture. The reaction mixture is heated further to 240° C. and the water of reaction formed is removed continuously. Over the entire synthesis, the PET flakes are gradually degraded, and a transparent mixture is formed, which is condensed until a product having an acid number <1.0 mg KOH/g is obtained.

The polymer obtained has the following properties:
Acid number: 75.6 mg KOH/g
Hydroxyl number: 0.7 mg KOH/g
Viscosity at 75° C.:

3 Methods

3.1 Determination of Viscosity:

Unless stated otherwise, the viscosity of the polyols was determined at 75° C. to DIN EN ISO 3219 (Jan. 10, 1994 edition) with a Rheotec RC 20 rotary viscometer using the CC 25 DIN spindle (spindle diameter: 12.5 mm; internal measuring cylinder diameter: 13.56 mm) at a shear rate of 50 1/s.

3.2 Measurement of Hydroxyl Number:

Hydroxyl numbers were determined by the phthalic anhydride method DIN 53240 (Jan. 12, 1971 edition) and reported in mg KOH/g.

3.3 Measurement of Acid Number:

Acid number was determined to DIN EN 1241 (Jan. 5, 1998 edition) and is reported in mg KOH/g.

4 General Preparation Example

The polyols were initially charged in a container at 60-80° C. and mixed by vigorous stirring with the components according to table 1. The reaction mixture was heated to above 80° C. and was then poured out onto a heated, Teflon-coated table. The cast slab obtained was heat-treated at 80° C. for 15 hours, then pelletized and processed by injection molding.

TABLE 1

Example compounds used

| | Comparison 1 | Example 1 | Example 2 | Example 3 | Example 4 | Example 5 |
|---|---|---|---|---|---|---|
| Polyol 1 [g] | | 650 | | | | |
| Polyol 2 [g] | | | 750 | | | |
| Polyol 3 [g] | | | | 750 | | |
| Polyol 4 [g] | | | | | 750 | |
| Polyol 5 [g] | | | | | | 520 |
| CE 1 [g] | | 143.2 | 102.5 | 105 | 165 | 234.7 |
| CE 2 [g] | 472.25 | | | | | |
| Isocyanate 1 [g] | 1000 | 562 | 476.8 | 506.8 | 646.2 | |
| Isocyanate 2 [g] | | | | | | 777.2 |
| Stabilizer 1 [g] | | 6.5 | 7.5 | 7.5 | 6 | 4.2 |
| Catalyst 1 [µl] | | | | | | 614 |
| Index | 1000 | 1000 | 1000 | 1000 | 1000 | 1000 |
| Hard segment content | 100% | 40% | 29.2% | 29.2% | 40% | 60% |
| Starting temperature | 70° C. | 60° C. | 60° C. | 70° C. | 60° C. | 80° C. |
| Casting temperature | 110° C. | 100° C. | 100° C. | 100° C. | 80° C. | 110° C. |

5 Mechanical Properties

The measurements collated in table 2 were established from injection-molded sheets of examples 1 to 5.
The following properties of the obtained polyurethanes were determined by the recited methods:
Hardness: DIN ISO 7619-1
Tensile strength and elongation at break: DIN 53504
Tear propagation resistance: DIN ISO 34-1, B (b)
Modulus of elasticity: DIN EN ISO 527
Abrasion measurement: DIN ISO 4649

TABLE 2

Mechanical properties of examples 1 to 5 and comparative example 1

| | Shore hardness | Elongation at break [%] | Tear propagation resistance [kN/m] | Abrasion [mm$^3$] | Modulus of elasticity [MPa] |
|---|---|---|---|---|---|
| Comparison 1 | 81 D | 190 | 273 | 106 | 2229 |
| Example 1 | 80 D | 320 | 274 | 52 | 2038 |
| Example 2 | 76 D | 410 | 268 | 56 | 2043 |
| Example 3 | 78 D | 330 | 279 | 68 | 3966 |
| Example 4 | 80 D | 390 | 266 | 64 | 2026 |
| Example 5 | 79 D | 340 | 215 | n.m. | 2144 |

In the presence of the PET polyols, it is possible to reduce the hard segment content (isocyanate and chain extender), and high values of >75 Shore D and simultaneously an elongation at break of >300% are nevertheless achieved. The materials obtained according to examples 1 to 5 are all transparent. The examples demonstrate particularly good properties are achieved at a PET content in the range from 40% to 50% and an average molecular weight Mw of the polyols of about 1000 g/mol.

CITED LITERATURE

U.S. Pat. No. 5,574,092
U.S. Pat. No. 5,627,254
WO 2015/063062 A1
WO 2007/118827 A1
Kunststoffhandbuch, volume 7, "Polyurethane", Carl Hanser Verlag, 3rd edition, 1993, chapter 3.1
Kunststoffhandbuch, volume 7, Carl Hanser Verlag, 1st edition 1966, p. 103-113

The invention claimed is:

1. A thermoplastic polyurethane, comprising, in reacted form:
    a polyisocyanate;
    a chain extender; and
    a polyol (P1),
    wherein the thermoplastic polyurethane is obtained by polymerizing a mixture comprising (i) a polyisocyanate composition, (ii) the chain extender, and (iii) a polyol composition comprising: the polyol (P1), which has a molecular weight Mw in a range of from 500 to 2000 g/mol, and comprises an aromatic polyester block (B1), the polyol (P1) is prepared here by reacting the aromatic polyester with dicarboxylic acids and diols and the aromatic polyester used has a higher molecular weight than the blocks (B1) present in the polyol (P1), and
    a hard segment content in the thermoplastic polyurethane is <75%.

2. The polyurethane of claim 1, wherein the polyester polyol (P1) comprises 20 to 70 wt. % of the aromatic polyester block (B1), based on an overall weight of polyester polyol (P1).

3. The polyurethane of claim 1, wherein the aromatic polyester block (B1) is a polyester of an aromatic dicarboxylic acid and an aliphatic diol.

4. The polyurethane of claim 1, wherein the aromatic polyester block (B1) is a polybutylene terephthalate block.

5. The polyurethane of claim 1, wherein the aromatic polyester block (B1) is a polyethylene terephthalate block.

6. The polyurethane of claim 1, wherein the polyol (P1) has a molecular weight Mw in a range of from 750 to 1500 g/mol.

7. The polyurethane of claim 1, wherein the chain extender is a diol having a molecular weight <220 g/mol.

8. The polyurethane of claim 1, wherein the chain extender and the polyol (P1) are present in the polyol composition in a molar ratio in a range of from 40:1 to 1:10.

9. The polyurethane of claim 1, wherein the polyol composition further comprises a second polyol which is a polyetherol, a polyesterol, a polycarbonate alcohol, or a hybrid polyol.

10. The polyurethane of claim 1, wherein the polyisocyanate is an aliphatic diisocyanate.

11. The polyurethane of claim 1, wherein the hard segment content in the thermoplastic polyurethane is in a range of from 10% to 75%.

12. A process for producing a shaped body, the process comprising:
  (a) preparing a thermoplastic polyurethane comprising, in reacted form, (i) polyisocyanate composition; (ii) a chain extender; and (iii) a polyol composition, the polyol composition comprising a polyol (P1) having a molecular weight Mw in a range of from 500 to 2000 g/mol and comprising an aromatic polyester block (B1), and a hard segment content in the thermoplastic polyurethane being<75%,
  wherein the polyol (P1) is prepared here by reacting the aromatic polyester with dicarboxylic acids and diols and the aromatic polyester used has a higher molecular weight than the blocks (B1) present in the polyol (P1); and
  (b) producing a shaped body from the thermoplastic polyurethane.

13. The process of claim 12, wherein the producing comprises extruding, injection molding, sintering, or solution processing the polyurethane to form the shaped body.

14. A shaped body, obtained by the process of claim 12.

15. The shaped body of claim 14, which is a consumer article.

16. The shaped body of claim 15, wherein the consumer article is a toothbrush, a razor, a domestic article housing, a display, a computer part, a phone part, a plug, an automobile interior trim part, or a footwear part.

17. The polyurethane of claim 1, wherein the polyisocyanate is an aromatic diisocyanate.

18. The polyurethane of claim 1, wherein the hard segment content in the thermoplastic polyurethane is in a range of from 29.2% to 60%.

19. The polyurethane of claim 1, wherein the polyol (P1) has an acid number<1 mg KOH/g.

20. The polyurethane of claim 1, having an elongation at break in a range of over 300% to 410%.

21. The polyurethane of claim 1, wherein a number of repeat units in an aromatic system is greater than 2 in series.

* * * * *